United States Patent [19]
Grossman

[11] Patent Number: 6,123,838
[45] Date of Patent: Sep. 26, 2000

[54] PURIFICATION SYSTEM FOR DRY CLEANING SEPARATOR WASTE WATER

[75] Inventor: Bruce Grossman, Encinitas, Calif.

[73] Assignee: Evaporation Technology International, Inc., San Diego, Calif.

[21] Appl. No.: 08/908,707

[22] Filed: Aug. 8, 1997

[51] Int. Cl.[7] .......................... B01D 1/16; B01D 17/032; B01D 36/04

[52] U.S. Cl. .......................... 210/97; 210/167; 210/196; 210/197; 210/202; 210/203; 210/205; 210/207; 210/220; 210/248; 210/295; 210/416.1; 210/502.1; 210/532.1; 210/908; 68/18 F; 68/18 D; 134/10

[58] Field of Search ...................................... 210/167, 170, 210/194, 195.1, 196, 197, 252, 262, 266, 287, 97, 198.1, 200–203, 205, 207, 220, 232, 248, 295, 416.1, 502.1, 532.1, 908; 68/18 F, 18 C, 18 R, 18 D; 134/10

[56] References Cited

U.S. PATENT DOCUMENTS

| | | | |
|---|---|---|---|
| 4,513,590 | 4/1985 | Fine | 210/409 |
| 4,879,888 | 11/1989 | Suissa | 210/167 |
| 4,885,099 | 12/1989 | Kelly | 210/774 |
| 5,431,827 | 7/1995 | Tatch | 210/767 |
| 5,469,876 | 11/1995 | Gray et al. | 134/105 |
| 5,525,213 | 6/1996 | Phillips | 210/167 |
| 5,637,212 | 6/1997 | Kim | 210/195.1 |
| 5,653,873 | 8/1997 | Grossman | 210/167 |

OTHER PUBLICATIONS

Patent Abstracts of Japan vol. 013, No. 408 (C–634), Sep. 8, 1989 & JP 01 148384 A (Fukuji Obata), Jun. 9, 1989 see abstract, figure.

Patent Abstracts of Japan, vol. 010, No. 365 (C–390), Dec. 6, 1986 & JP 61 164607 A (Mitsubishi Heavy Ind Ltd), Jul. 25, 1986 see abstract; figure.

Database WPI Section Ch. Week 8602 Derwent Publications Ltd., London, GB; Class D15, AM 86–011543 XP002082930 see abstract –& JP 60 236694 A (Sanyo Electric Co) Nov. 25, 1985 see figure 1.

Database WPI Section Ch. Week 9317 Derwent Publications Ltd., London, GB; Class D 15, AM 93–139766 XP002082931 & JP 05 076861 A (Ebara Infilco KK), Mar. 30, 1993 See abstract; figure.

*Primary Examiner*—Robert J. Popovics
*Attorney, Agent, or Firm*—Peter K. Hahn, Esq.; Luce, Forward, Hamilton & Scripps LLP

[57] ABSTRACT

A method and apparatus for purifying separator waste water from a dry cleaning process. The present invention utilizes 3 stages of purification. In Stage one, highly contaminated separator waste water is put into a solvent separator tank. Liquid solvent settles out of the separator waste water, sink to the bottom of the solvent separation tank where it accumulates below the separated water. In Stage 2 air bubbles are introduced through the separated water, stripping out much of the solvent which is dissolved in the separated water and reducing the dissolved solvent concentration. This air stripping process dramatically extends to useful life of the granulated carbon in the granulated eaton filter. Stage 3 takes the air stripped water and filters it through a granulated carbon filter, which results in the carbon purified water having a dissolved solvent of less than 0.7 parts per million. The carbon purified water can then be safely and economically disposed of without harming the environment.

7 Claims, 2 Drawing Sheets

6,123,838

PURIFICATION SYSTEM FOR DRY CLEANING SEPARATOR WASTE WATER

FIELD OF THE INVENTION

The present invention relates to dry cleaning systems and more particularly the purification of dry cleaning separator waste water.

BACKGROUND OF THE INVENTION

Dry cleaning machines and processes utilize a dry cleaning fluid which is normally a solvent, such as perchlorethylene. During the dry cleaning process a liquid waste stream is generated, known as separator waste water. This separator waste water is water with a small amount of entrained and dissolved solvent. The separator waste water is generated by the condensing process used in reclaiming solvent from washed garments during the drying phase of the dry cleaning process, and in condensing solvent vapor emitted by a solvent still.

Until the advent of regulations governing the disposal of the separator waste water, the separator waste water was poured down the drain. Now, the separator waste water is classified as a hazardous waste and environmental regulations prohibit the improper disposal of the liquid. Laws and regulations limit the amount of hazardous waste, such as dry cleaning solvents, that may be released onto the environment. Consequently, disposal of the separator waste water requires costly hazardous waste disposal procedures.

Systems that reclaim or recover solve from and/or decontaminate separator waste water are known in the art. U.S. Pat. No. 5,653,873 to Grossman describes a system and method for reducing liquid waste generated by dry cleaning. U.S. Pat. No. 5,236,580 to Kelleher describes a device for reclaiming dry cleaning solvents from a dry cleaning machine. U.S. Pat. No. 5,223,126 to Phillips describes a filtration system for decontaminating dry cleaning waste water, a thermal evaporation system for convert treated water into steam and a condenser to condense the steam back to water which is later disposed of. The Phillips device requires connection to a high voltage electrical source to power heating elements which evaporate the filtered water. This system would be subject to corrosion requiring the use of expensive corrosion resistant materials in the evaporation chamber. In addition, frequent replacement of expensive cartridge type filters would be necessary. Other systems include those disclosed in U.S. Pat. No. 4,354,363 to Holder and U.S. Pat. No. 4,513,590 to Fine.

Environmental considerations coupled with increasing disposal costs indicate a need for an efficient and effective system for reducing liquid waste generated by dry cleaning. In particular, it would be beneficial to provide an apparatus and method which would economically reduce the hazardous liquid waste.

Accordingly, it would be desirable to provide an apparatus and method which would economically reduce the liquid hazardous waste generated by the dry cleaning process by efficiently reclaiming the solvent from the separator waste water using an apparatus that does not require electrical power, heat or costly filter cartridges. This apparatus and method would purify the waste water into solvent, most of which could be recycled within the dry cleaning machine and highly purified water which may be safely and economically disposed of without harming the environment.

SUMMARY OF THE INVENTION

It is an object of the invention to provide apparatus and method to purify the separator waste water generated by the dry cleaning process that does not require electrical power, heat or costly filter cartridges. The present invention utilizes 3 stages of purification. In Stage one, highly contaminated separator waste water is put into a solvent separator tank. Liquid solvent settles out of the separator waste water, sinking to the bottom of the solvent separation tank where it accumulates below the separated water. In Stage 2 air bubbles are introduced through the separated water, stripping out much of the solvent which is dissolved in the separated water and reducing the dissolved solvent concentration. This air stripping process dramatically extends to useful life of the granulated carbon in the granulated carbon filter. Stage 3 takes the air stripped water and filters it through a granulated carbon filter, which results in the carbon purified water having a dissolved solvent of less than 0.7 parts per million. The carbon purified water can then be safely and economically disposed of without harming the environment.

BRIEF DESCRIPTION OF THE DRAWINGS

The foregoing and the other features of the present invention will be best appreciated with reference to the following description of a specific embodiment of the invention, when read in conjunction with the accompany drawings.

DETAILED DESCRIPTION OF THE PREFERRED EMBODIMENTS

Figures 1, 2:
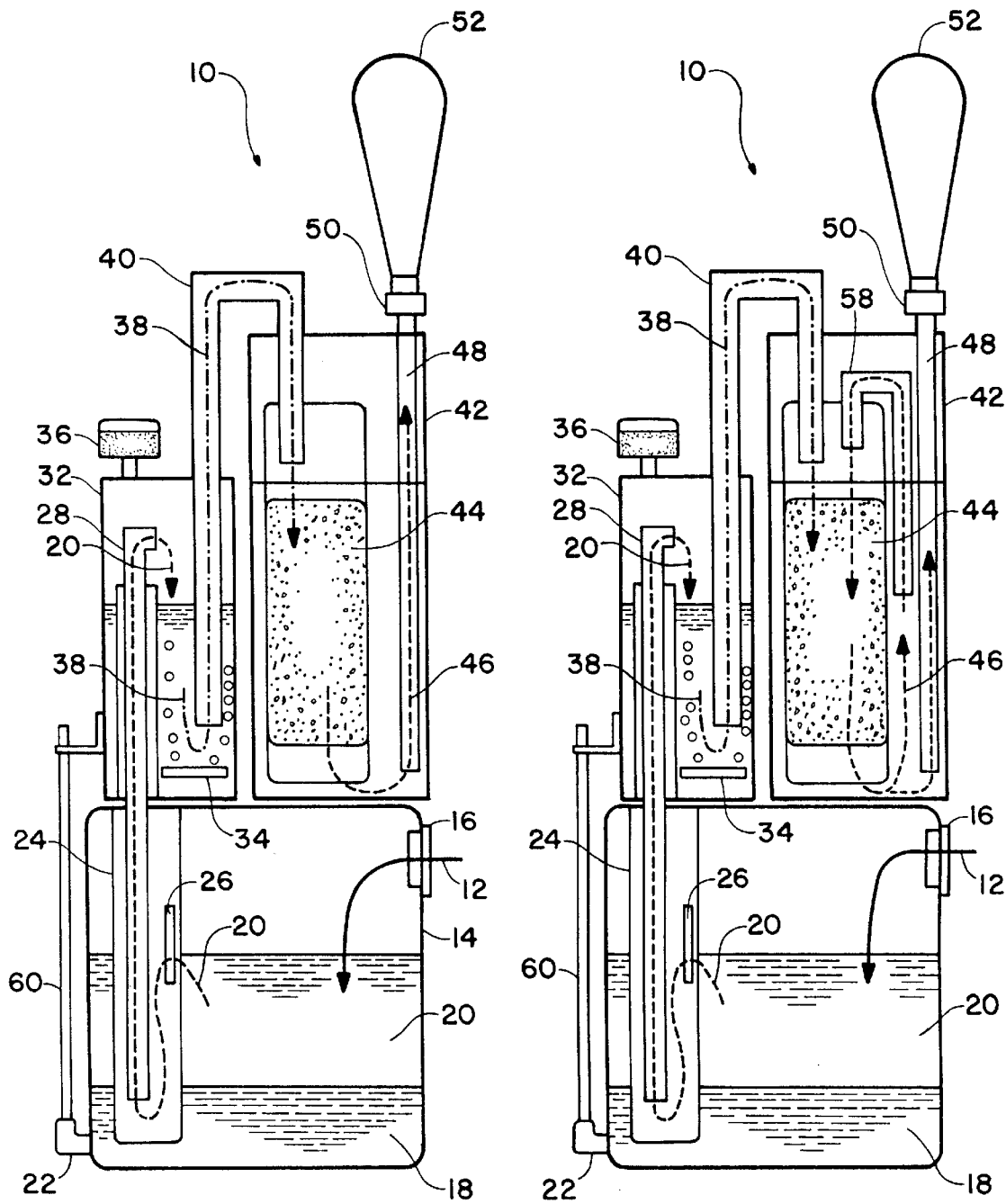
FIG. 1 is a sectional view of the present invention.
FIG. 2 is similar to FIG. 1 showing an alternate configuration of the present invention.

FIG. 1 shows the purification system 10 for the separation of solvent and water that is in a contaminated effluent containing both liquid phase solvent and water containing dissolved solvent as a byproduct of the dry cleaning process. The purification system 10 has 3 stages of purification. In Stage one, highly contaminated separator waste water 12 (dissolved solvent concentration >150 parts per million) is put into a solvent separator tank 14. Liquid solvent 18 settles out of the separator waste water 12, sinking to the bottom of the solvent separation tank 14 where it accumulates below the separated water 20 (dissolved solvent concentration <150 parts per million). In Stage 2 air bubbles are introduced through the separated water 20, stripping out much of the solvent which is dissolved in the water form air stripped water 38, reducing the dissolved solvent concentration to less than 2 parts per million. This air stripping process dramatically extends to useful life of the granulated carbon in the granulated carbon filter 44. Stage 3 takes the air stripped water 38 and filters it through a granulated carbon filter 44, which results in the carbon purified water 46 having a dissolved solvent of less than 0.7 parts per million. The carbon purified water 46 is then disposed of by evaporation or other means. Below, the process is described in greater detail.

Figures 3, 4:
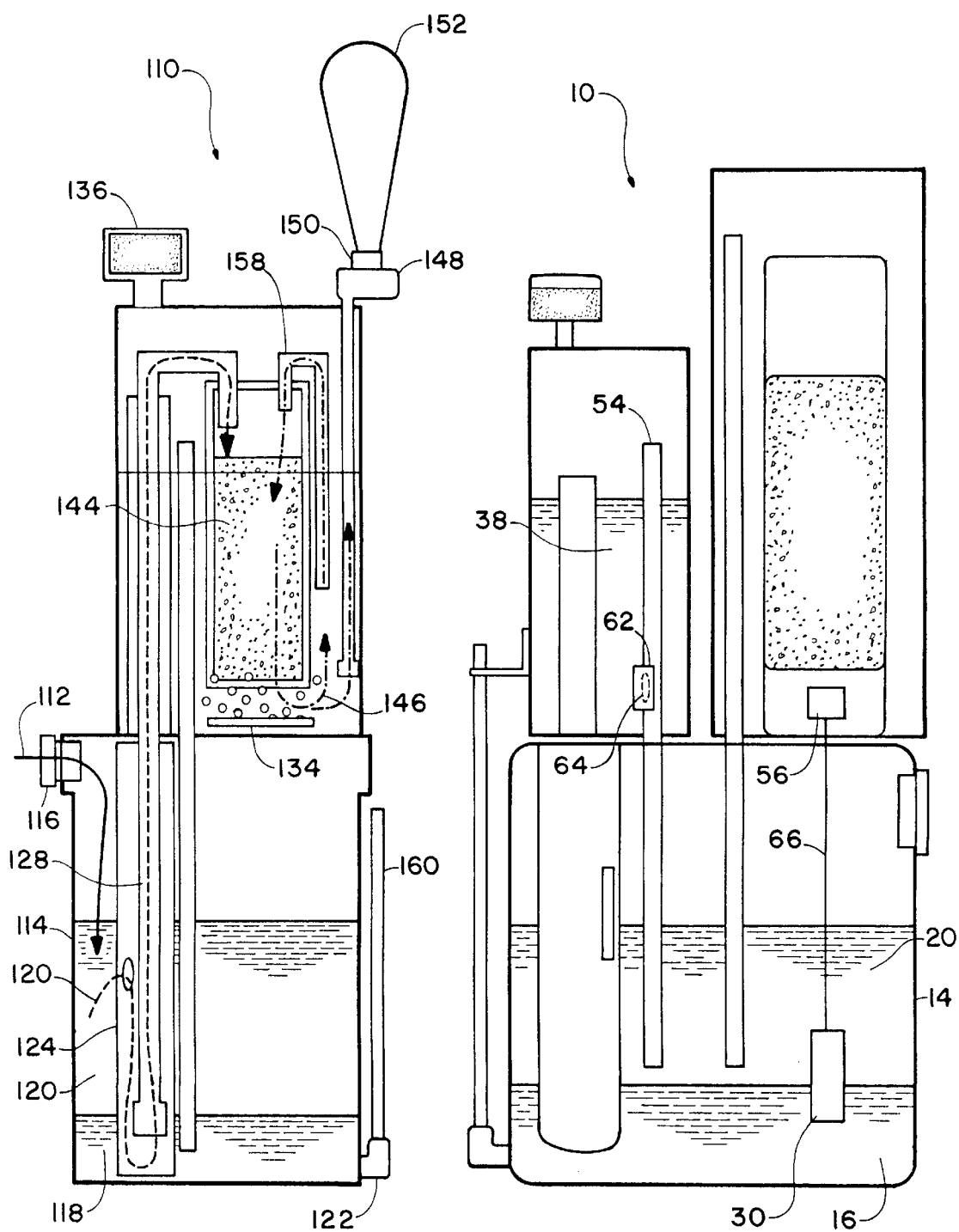
FIG. 3 is similar to FIG. 1 showing the safety features of the present invention.
FIG. 4 is a sectional view showing a alternate configuration of the present invention.

Referring FIGS. 1, 2 and 3, the separator waste water 12, comprising water and dissolved solvent such as perchlorethylene or trichloroethylene in the concentration of approximately 150 to 300 parts per million and small amounts of liquid phase solvent from the dry cleaning machine separator, is introduced into a solvent separator tank 14 at the separator tank inlet port 16. The liquid phase solvent portion 18 settles by gravity out of the separator waste water 12 into the bottom of the solvent separator tank 14, thereby creating a layer of liquid solvent 18 beneath a layer of separated water 20. The liquid phase solvent portion 18 is then decanted through the solvent exit port 22 of the solvent separator tank 14 through the solvent drain tube 60 for re-use. Once the separated water 20 reaches a predetermined level in the solvent separator tank 14, the separated water 20 enters the solvent exclusion weir 24 through the solvent exclusion weir inlet 26. Inside the solvent exclusion weir 24 is the solvent separator pump 28, which pumps the separated water 20 to the air stripping tower 32. The solvent separator pump 28 may be either pneumatic or electric powered.

The separated water 20 enters the air stripping tower 32 near the top. At the bottom of the air stripping tower 32 is an air bubble ring 34 that releases air bubbles into the separated water 20. As the air bubbles up through the separated water 20, the air bubbles evaporate dissolved solvent from the separated water 20 reducing the solvent concentration. Once the separated water 20 reaches the bottom of the air stripping tower 32 and becomes air stripped water 38, over 95% of the dissolved solvent concentration has been removed by the air bubbles (from 48.99 milligrams of solvent per liter of separated water 20 to 0.866 milligrams of solvent per liter of air stripped water 38). Air exiting the air stripping tower 32 is vented through an air vent filter 36. The air vent filter 36 contains 0.5 pounds of granulated carbon, like Calgon type K300, that filters the solvent from the air so that the solvent vapor concentration in the air vented to the room is under 1 part per million solvent.

The air stripped water 38 is then pumped by the air stripping pump 40 into the top of the granulated carbon filter 44 located inside of the carbon circulation tower 42. The air stripping pump 40 may be either pneumatic or electric. The granulated carbon filter 44 contains Calgon type K300 granulated carbon. The air stripped water 38 is filtered through the granulated carbon and becomes carbon purified water 46. This circulation through the granulated carbon filter 44 can result in the reduction of greater than 97% of the dissolved solvent concentration (from 0.866 milligrams of solvent per liter of air stripped water 38 to 0.025 milligrams of solvent per liter of carbon purified water 46).

In order to fully utilize the adsorptive capabilities of the granulated carbon, a carbon circulation pump 58 may be used to continuously re-circulate the carbon purified water 46 through the granulated carbon filter 44, as shown in FIG. 2

The carbon purified water 46 is then pumped through an air driven nozzle pump 48 to the evaporation nozzle 50. The evaporation nozzle 50 can be used to evaporate the carbon purified water directly into the air or coupled with an impingement device (not shown) to collect the water exiting the nozzle in liquid form for other means of disposal. The evaporation nozzle 50 itself acts as a additional air stripping stage by diluting the carbon purified water 46. The dilution varies from a factor of 200:1 to 500:1 air volume to water volume in the evaporation nozzle plume 52. Impinging the air mixture exiting the evaporation nozzle 50 results in a reduction of over 97% of dissolved solvent in the carbon purified water 46 (0.025 milligrams of solvent per liter of carbon purified water 46 to a non detectable level of under 0.0005 milligrams of solvent per liter exiting the nozzle).

FIG. 3 shows the safety devices that may be incorporated in to the present invention. A solvent level float 30, which rises in a specific gravity above 1.09, is located inside the separator tank 14 and is connected to a solvent level switch 56 through linkage 66. The solvent level switch 56 controls the power source to the solvent separator pump 28 and/or the air driven nozzle pump 48. When the liquid phase solvent portion 18 in the separator tank 14 reaches a pre-set level, the float level 30 rises and engages solvent level switch 56 through linkage 66 and turns off the power source to the solvent separator pump thus shutting down the operation of the purification system. The solvent level switch 56 may be either pneumatic or electric and may also control other pumps associated with the system or the input of the separator waste water 12 to the purification system 10. Another safety feature is an overflow tube 54 that connects the air stripping tower 32 to the solvent tank 14. A fuse 62, made of styrene plastic that is dissolvable by solvent, covers a drain port 64 located in the overflow tube 54. If liquid phase solvent should be present in the air stripping tower 32, the fuse 54 will dissolve uncovering drain port 64 allowing the fluid in the air stripping tower 32 to drain back into the separator tank 14 thereby short circuiting the water flow path through the purification system 10 thus providing a secondary solvent detection system.

The purification system 110 shown in FIG. 4 is an alternate configuration of the present invention. It is similar to FIG. 1 except the air stripping tower is combined with the carbon circulation tower to form one filter tower 132. Separator waste water 112 is introduced into the solvent separator tank 114 at the separator tank inlet port 116. The liquid phase solvent portion 118 settles by gravity out of the separator waste water 112 into the bottom of solvent separator tank 114, thereby creating a layer of liquid solvent 18 beneath a layer of separated water 120. The liquid phase solvent portion 118 is then decanted through the solvent exit port 122 of the solvent separator tank 114 through the solvent drain tube 160 for re-use. Once the separated water 120 reaches a predetermined level in the solvent separator tank 114, the separated water 120 enters the solvent exclusion weir 124 through the solvent exclusion weir inlet 126. Inside the solvent exclusion weir 124 is the solvent separator pump 128. The solvent separator pump 128 may be either pneumatic or electric powered.

The solvent separator pump 128 pumps the separated water 120 into the top of the granulated carbon filter 144, located inside of the to the filter tower 132. The granulated carbon filter 144 contains Calgon type K300 granulated carbon. The separated water 120 is filtered through the granulated carbon and becomes carbon purified water 146. At the bottom of the filter tower 132 is a air bubble ring 134 that releases air bubbles into the carbon purified water 146. As the air bubbles up through the carbon purified water 146, the air bubbles evaporate dissolved solvent from the carbon purified water 146 reducing the solvent concentration. Air exiting the filter tower 132 is vented through an air vent filter 136. The air vent filter 136 contains 0.5 pounds of granulated carbon, like Calgon type K300, that filters the solvent from the air so that the solvent vapor concentration in the air vented to the room is under 1 part per million solvent.

In order to fully utilize the adsorptive capabilities of the granulated carbon, a carbon circulation pump 158 may be used to continuously re-circulate the carbon purified water 146 through the granulated carbon filter 144, as shown in FIG. 4.

The carbon purified water 146 is then pumped through an air driven nozzle pump 148 to the evaporation nozzle 150. The evaporation nozzle 150 can be used to evaporate the carbon purified water 146 directly into the evaporation nozzle plume 152 or coupled with an impingement device (not shown) to collect the water exiting the nozzle in liquid form for other means of disposal.

The method of using the purification system 10 is as follows: highly contaminated separator waste water 12 is put into the solvent separator tank 14. Liquid solvent 18 settles out of the separator waste water 12, sinking to the bottom of the solvent separation tank 14 where it accumulates below the separated water 20. The liquid solvent is then reclaimed. The solvent content in the separated water 20 is then lowered using air bubbles that are bubbled through the separated water 20, stripping out much of the solvent which is dissolved in the water and reducing the dissolved solvent concentration and forming air stripped water 38. This air stripping process dramatically extends to useful life of the granulated carbon in the granulated carbon filter 44. The solvent content in the air stripped water 38 is further lowered with the use of the carbon filter. The air stripped water 38 is filtered through the granulated carbon filter 44, which results in the carbon purified water 46 having a dissolved solvent of less than 0.7 parts per million. The carbon purified water 46 is then disposed of by evaporation or other means.

The preceding specific embodiments are illustrative of the practice of the invention. It is to be understood, however, that other expedients known to those skilled in the art or disclosed herein, may be employed without departing from the spirit of the invention or the scope of the appended claims.

| No. | Component |
|-----|-----------|
| 10 | Purification System |
| 12 | Separator Waste Water |
| 14 | Solvent Separator Tank |
| 16 | Separator Tank Inlet Port |
| 18 | Liquid Phase Solvent Portion |
| 20 | Separated Water |
| 22 | Solvent Exit Port |
| 24 | Solvent Exclusion Weir |
| 26 | Solvent Exclusion Weir Inlet |
| 28 | Solvent Separator Pump |
| 30 | Solvent Sensor |
| 32 | Air Stripping Tower |
| 34 | Air Bubble Ring |
| 36 | Air Vent Filter |
| 38 | Air Stripped Water |
| 40 | Air Stripping Pump |
| 42 | Carbon Circulation Tower |
| 44 | Granulated Carbon Filter |
| 46 | Carbon Purified Water |
| 48 | Air Driven Nozzle Pump |
| 50 | Evaporation Nozzle |
| 52 | Plume |
| 54 | Overflow Tube |
| 56 | Solvent Level Switch |
| 58 | Carbon Circulation |
| 60 | Solvent Drain Tube |
| 62 | Styrene Fuse |
| 64 | Overflow Tube Drain Port |
| 66 | Solvent Level Switch Linkage |
| 110 | Purification System |
| 112 | Separator Waste Water |
| 114 | Solvent Separator Tank |
| 116 | Separator Tank Inlet Port |
| 118 | Liquid Phase Solvent Portion |
| 120 | Separated Water |
| 122 | Solvent Exit Port |
| 124 | Solvent Exclusion Weir |
| 126 | Solvent Exclusion Weir Inlet |
| 128 | Solvent Separator Pump |
| 132 | Filter Tower |
| 134 | Air Bubble Ring |
| 136 | Air Vent Filter |
| 144 | Granulated Carbon Filter |
| 146 | Carbon Purified Water |
| 148 | Air Driven Nozzle Pump |
| 150 | Evaporation Nozzle |
| 152 | Plume |
| 158 | Carbon Circulation Pump |
| 160 | Solvent Drain Tube |

What is claimed is:

1. An apparatus for purifying separator waste water from a dry cleaning process comprising:

a separator tank with sides, a top end and a bottom end, an inlet located near the top end of the separator tank for the introduction of dry cleaning waste water, the dry cleaning waste water containing solvent and water, the solvent settling by gravity below the separated water;

a solvent exclusion weir located in the separator tank, the solvent exclusion weir containing an inlet that allows separated water to enter the exclusion weir located near the top of the separator tank;

a first pump for moving the separated water from the solvent exclusion weir to an air stripping tower;

the air stripping tower having sides, a top end and a bottom end, the separated water entering near the top of the air stripping tower, a bubble ring located near the bottom of the air stripping tower allowing air bubbles to be in contact with the separated water, the air bubbles dissolving solvent in the separated water forming air stripped water;

a second pump for moving the air stripped water from the bottom end of the air stripping tower to the top of a carbon filter;

the carbon filter having sides and a top and a bottom, the air stripped water entering the top of the carbon filter, the dissolved solvent in the air stripped water being filtered by the carbon filter forming carbon purified water exiting from the bottom of the carbon filter; and a third pump for moving the carbon purified water from the bottom of the carbon filter to an evaporation nozzle for evaporating the carbon purified water into the air.

2. The apparatus of claim 1 further comprising a level device including a solvent level float located inside of the separator tank, the solvent level float moving up and down inside the separator tank and regulating the power to the first pump for moving the separated water from the solvent exclusion weir to the air stripping tower the first safety device stopping the power to the first pump when the solvent level in the separator tank reaches a pre-set level.

3. The apparatus of claim 1 further comprising an overflow device including an overflow tube with a top end and a bottom end, the overflow tube connecting the air stripping tower to the separator tank, the top end portion of the overflow tube being located inside the air stripping tower and the bottom end portion located inside the separator tank, a drain port being located near the top of the overflow tube inside the air stripping tower, a solvent dissolvable styrene fuse covering the drain port such that when the styrene fuse is dissolved by solvent, the air stripped water flows into the drain port of the overflow tube and exits the overflow tube in the separator tank.

4. The apparatus of claim 1 further comprising a carbon recirculation pump, the carbon recirculating pump moving the carbon purified water exiting from the bottom of the carbon filter to the top of the carbon filter to be filtered again.

5. An apparatus for purifying separator waste water from a dry cleaning process comprising:

a separator tank for separating waste water into separated water and solvent, the solvent settling by gravity below the separated water, the separator tank having an inlet located near a top end for the input waste water and an outlet located near a bottom end for removing the solvent settled by gravity;

an air stripping tower having an inlet near a top end of the air stripping tower for the separated water, a bubble ring located near a bottom end of the air stripping tower allowing air bubbles to be in contact with the separated water, the air bubbles dissolving solvent in the separated water forming air stripped water, an outlet for removing the air stripped water from the air stripping tower;

a first pump connected to the separator tank and the air stripping tower;

a first device controlling the first pump, the first device stopping the first pump in response to the solvent in the separator tank reaching a pre-set level;

a carbon circulation tower having an internal carbon filter, the carbon circulation tower having an inlet near a top end for the air stripped to enter, the dissolved solvent in the air stripped water being filtered by the carbon filter forming carbon purified water, an outlet for removing the carbon purified water from the carbon circulation tower;

a second pump connected to the air stripping tower and carbon circulation tower;

an evaporation nozzle for evaporating the carbon purified water; and a third pump connected to the carbon recirculation tower and the evaporation nozzle.

6. The apparatus of claim 5 further comprising a carbon recirculation pump for moving the carbon purified water exiting the carbon filter back into the carbon filter to further filter the carbon purified water prior to its removal from the carbon circulation tower.

7. The apparatus of claim 5 further comprising:

a second device including an overflow tube with a drain port connecting the solvent separator tank and the air stripping tower; and a solvent dissolvable fuse located in the air stripping tower covering the drain whereby if liquid solvent is introduced into the air stripping tower, the fuse is dissolved by the solvent and the fluid in the air stripping tower is removed through the overflow tube.

* * * * *